United States Patent [19]

Shaw et al.

[11] 4,256,213

[45] * Mar. 17, 1981

[54] FLEXIBLE MOBILE CONVEYOR

[75] Inventors: Howard A. Shaw, Indiana County; John D. Todhunter, Cambria County, both of Pa.

[73] Assignees: Gordon A. Brewer; Eugene F. Buell, both of Pittsburgh, Pa.

[*] Notice: The portion of the term of this patent subsequent to Aug. 17, 1993, has been disclaimed.

[21] Appl. No.: 833,190

[22] Filed: Sep. 14, 1977

Related U.S. Application Data

[63] Continuation of Ser. No. 692,668, Jun. 4, 1976, abandoned, which is a continuation of Ser. No. 193,802, Oct. 29, 1971, Pat. No. 3,974,907.

[51] Int. Cl.³ .............................................. B65G 41/00
[52] U.S. Cl. ..................................... 198/303; 198/864
[58] Field of Search ............... 198/300, 303, 315–317, 198/586, 587, 589, 590, 606, 864; 299/43 R, 45, 56, 64, 67; 180/14 R

[56] References Cited

U.S. PATENT DOCUMENTS

| 775,765 | 11/1904 | Renard | 180/14 R |
|---|---|---|---|
| 2,722,409 | 11/1955 | Bergmann | 198/587 |
| 2,744,614 | 5/1956 | Sibley | 198/864 |
| 2,875,885 | 3/1959 | Kilbourne | 198/864 |
| 3,231,064 | 1/1966 | Towles | 198/303 |
| 3,279,584 | 10/1966 | Towles | 198/303 |
| 3,974,907 | 8/1976 | Shaw et al. | 198/589 |

Primary Examiner—Joseph E. Valenza
Attorney, Agent, or Firm—Buell, Blenko, Ziesenheim & Beck

[57] ABSTRACT

A flexible mobile conveyor is provided which is particularly useful in deep mining operations. The conveyor comprises a plurality of carriages, a pair of wheels supporting each carriage, an endless conveyor mounted on each carriage, drive means on each carriage engaging and driving the conveyor means, a swivel connection between each pair of carriages permitting generally universal movement between adjacent carriages and a main power source on one of said carriages, driving the supporting wheels.

2 Claims, 10 Drawing Figures

FLEXIBLE MOBILE CONVEYOR

This application is a continuation of our copending application Ser. No. 692,668, filed June 4, 1976, now abandoned, which in turn was a continuation of Ser. No. 193,802, filed Oct. 29, 1971, now U.S. Pat. No. 3,974,907, issued Aug. 17, 1976.

This application relates to flexible mobile conveyors, and particularly to a conveyor for underground mining operations and more particularly to a flexible mobile conveyor for use in conveying coal from the mining machine to a main underground belt conveyor.

It is common practice in mining coal and other subterranean minerals to convey the mined material from a point spaced from the mine face to the mouth of the mine by way of a main conveyor belt or alternatively by rail in a multicar electrically driven train. In either case, there is a considerable distance between the face where the coal or other mineral is mined and the point where the main conveyor system begins. There has been a great need for some mechanism for rapidly moving the mined material from the mine's face to the main means of conveying. Many devices have been provided in an effort to solve this problem but they have lacked the flexibility which is essential to such a machine for it to be successful in this environment.

In order to be successful, such a mobile conveyor must be universally flexible, it must be easily elongated without losing its effectiveness, it must be readily transportable and readily adjustable from place to place. We have developed a flexible mobile conveyor which satisfies all of these requirements. It is readily changed in length, it is completely angularly flexible, it is readily transportable from place to place, and it is readily integrated with modern mining machinery.

Preferably, we provide a plurality of carriages, a pair of wheels supporting each carriage, an endless conveyor mounted on each carriage having a ramp on one end thereof, drive means on each carriage engaging and driving the conveyor means, a swivel connection between each carriage permitting generally universal movement between adjacent carriages, a main power source on one of said carriages, a drive shaft longitudinally of each carriage driving the carriage wheels and a universal flexible coupling at each end of each drive shaft forming a part of the swivel connection adapted to engage like couplings on the shaft of each next adjacent wheel. Preferably, at least one end of each conveyor is mounted on a flexible arm having dependent lugs which engage the sides of the next adjacent conveyor so that when the angle between the conveyor changes, the end follows the next adjacent conveyor.

In the foregoing general description, we have set out certain objects, purposes and advantages of our invention. Other objects, purposes and advantages will be apparent from a consideration of the following descriptions and the accompanying drawings in which.

Figure 1:
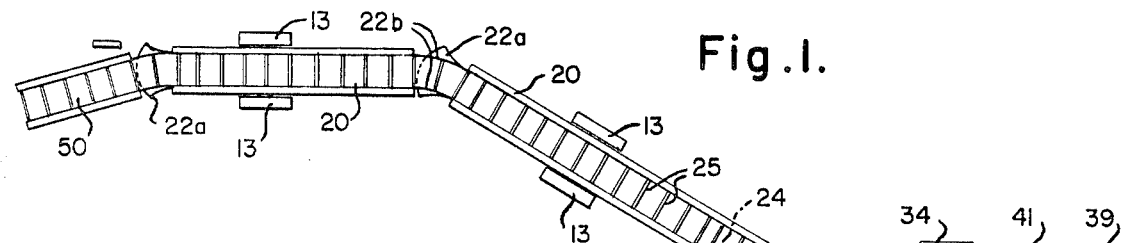
FIG. 1 is a plan view of a mobile conveyor system according to our invention.
Figure 2:
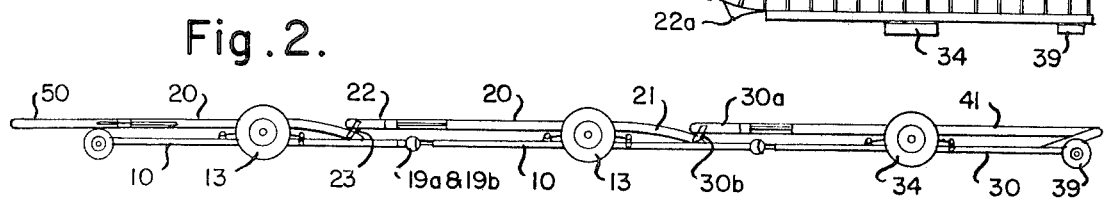
FIG. 2 is a side elevation of the mobile conveyor of FIG. 1.
Figure 3:
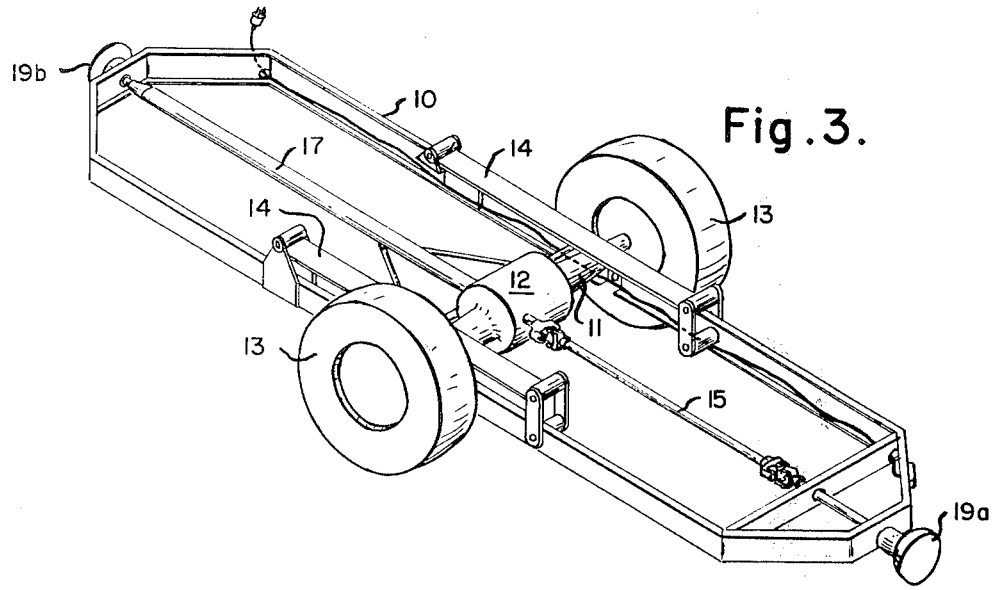
FIG. 3 is an isometric view of the chassis of the conveyor of FIGS. 1 and 2.
Figure 5:
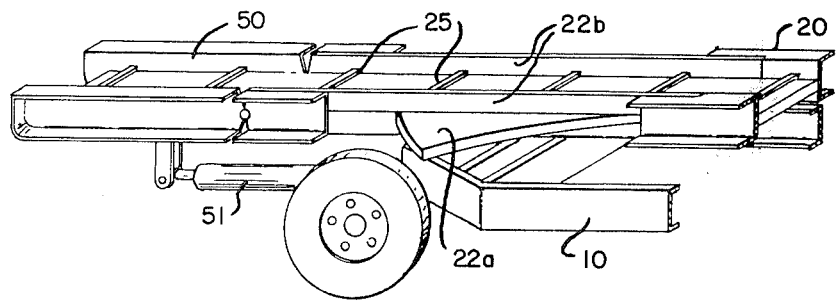
FIG. 5 is a fragmentary isometric view of the discharge ends of the last conveyor section.
Figure 4A:
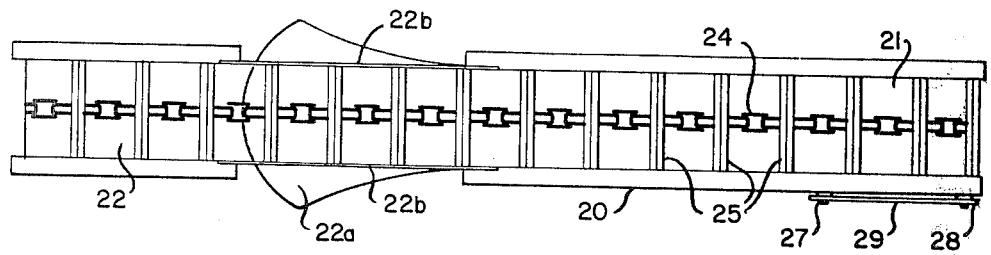
FIG. 4A is a top plan view of the conveyor mechanism.
Figure 4B:
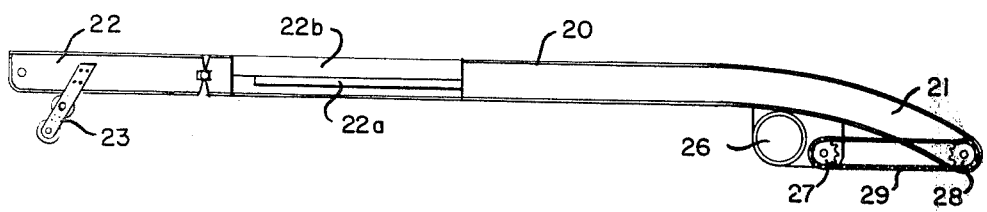
FIG. 4B is a side elevation of the conveyor section of the apparatus of our invention.
Figure 6:
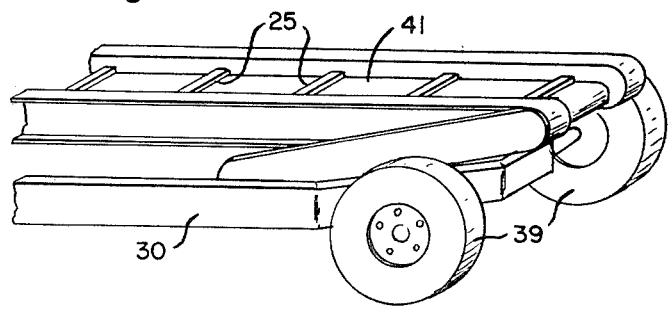
FIG. 6 is a side elevational view of the input end of the first conveyor section according to our invention.
Figure 7:
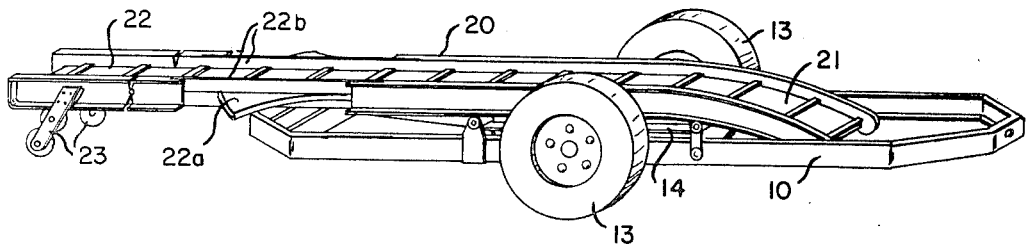
FIG. 7 is an isometric view of a typical intermediate conveyor unit according to our invention.
Figure 8:
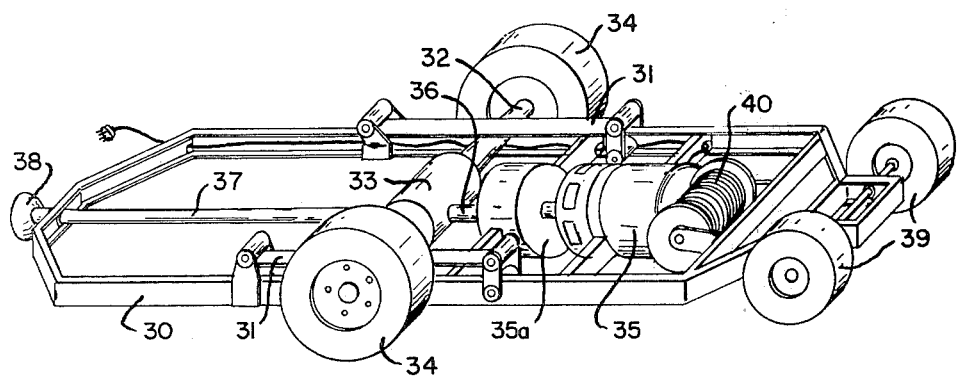
FIG. 8 is an isometric view of the drive carriage according to our invention.
Figure 9:
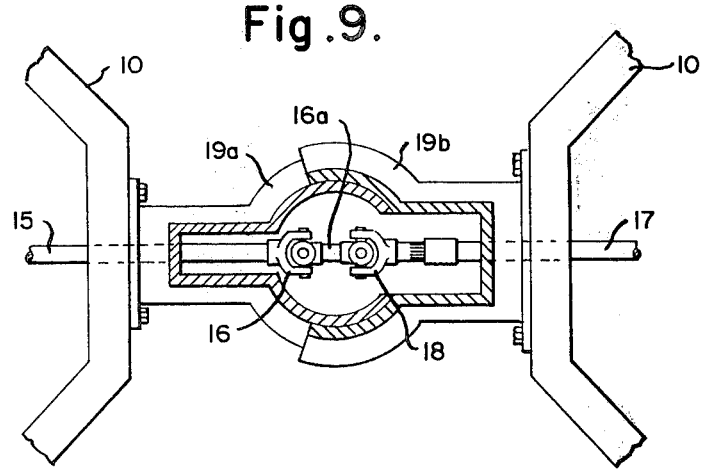
FIG. 9 is a section through a ball joint swivel connection for the conveyor chassis.

Referring to the drawings, we have illustrated a flexible mobile conveyor unit consisting of a plurality of conveyor units a discharge unit and a monitor and drive unit. Each conveyor unit is made up of a chassis frame 10 carrying an axle 11 intermediate its ends with a differential gear drive 12 therein and carrying spaced apart rubber tired wheels 13 which support the unit. The axles 11 are mounted on springs 14 which basically carry the load. The differential 12 is driven by means of a shaft 15 through a universal joint 16 at one end of the frame at the ball joint 19a. A second shaft 17 driven from the opposite side of the differential 12 drives a universal joint 18 in the ball joint 19b at the opposite end of the conveyor through a coupling 18a. Universal joints 16 and 18 are connected by a short shaft 16a. Mounted on each of the frames 10 is a conveyor 20 which has a ramp 21 at one end and a flexible discharge segment 22 at the opposite end provided with depending lugs 23. These lugs 23 are adapted to engage the side of the ramp 21 on the next succeeding conveyor so that the flexible end follows and overlays the next ramp. Each flexible end is provided with a triangular pan 22a and spaced flexible side wall segments 22b on opposite sides of the conveyor chain. The conveyor includes a conveyor chain 24 with conveyor pans 25 moving along the floor of the conveyor and driven by a motor 26 through sprockets 27 and 28 and chain 29.

We provide a monitor and drive unit having a frame 30 mounted through springs 31 on an axle 32 with a differential drive 33 driving wheels 34 on opposite sides of the frame 30. The differential 33 is driven from a power unit 35 through a shaft 36. The shaft 36 is also connected to an output shaft 37 which extends through one end of the frame 30 and is provided with a flexible coupling 38 in ball joint 19b which is connected to the flexible coupling 16 of ball joint 19a of the adjacent conveyor unit. The frame 30 is also provided with caster wheels 39 at its end opposite the universal joint 38. These wheels are used for steering of the power unit. A cable reel 40 is provided on the monitor through which power is supplied to the motor 35 from a usual source of mine power. A conveyor 41 is mounted on the frame 30 and is provided with a flexible discharge segment 30a with depending lugs 30b corresponding to lugs 23 and segment 22 of the conveyor.

The discharge unit is made up of a conveyor table 50 supported and raised and lowered by piston 51 on a standard conveyor unit 20 so that it can be raised at an angle.

The apparatus of this invention operates as follows: The monitor unit is connected to a series of conveyor units and moved to a point adjacent the mine face with the first conveyor adjacent the monitor unit in a position to receive coal from the miner. Each succeeding conveyor will align itself as the monitor is moved into position with the last conveyor unit extending over and discharging on to the main mine conveyor. Each of the conveyor drive units is energized to operate its associated conveyor and coal discharged on to one conveyor is carried over it and discharged on to the ramp of the next conveyor where it is carried to the next succeeding conveyor.

While we have illustrated and described certain preferred embodiments of our invention in the foregoing general description, it will be understood that this invention may be otherwise embodied within the scope of the following claims.

We claim:

1. A flexible mobile conveyor comprising a plurality of carriages, a single pair of wheels intermediate the ends of each said carriage supporting each carriage, an endless conveyor mounted on each carriage, drive means on each carriage engaging and driving the conveyor, connections between each successive conveyor whereby a portion of the end of one conveyor of one carriage overlies and feeds onto an end of the conveyor of the next succeeding carriage, each said conveyor having sidewalls extending from end to end on opposite sides, said sidewalls having a flexible portion at one end extending onto the next adjacent conveyor across said overlying portion whereby said flexible portion is free to bend in the plane of the conveyor, means on said portion of the said one conveyor engaging and carried by said end of the next succeeding conveyor, and connections between said carriages including a swivel connection between each pair of carriages permitting generally universal movement between adjacent carriages, a main power source on one of said carriages, drive connections from said main power source driving the pair of supporting wheels in each successive carriage and a final discharge carriage having a conveyor member hinged intermediate its ends and means on the carriage for rotating the conveyor about said hinge to change the elevation of its discharge.

2. A conveyor as claimed in claim 1 wherein the hinged portion is connected to a horizontally flexible conveyor section.

* * * * *